May 20, 1941.  L. MACHTS  2,242,312
GEOPHYSICAL APPARATUS
Filed May 28, 1938  3 Sheets-Sheet 1
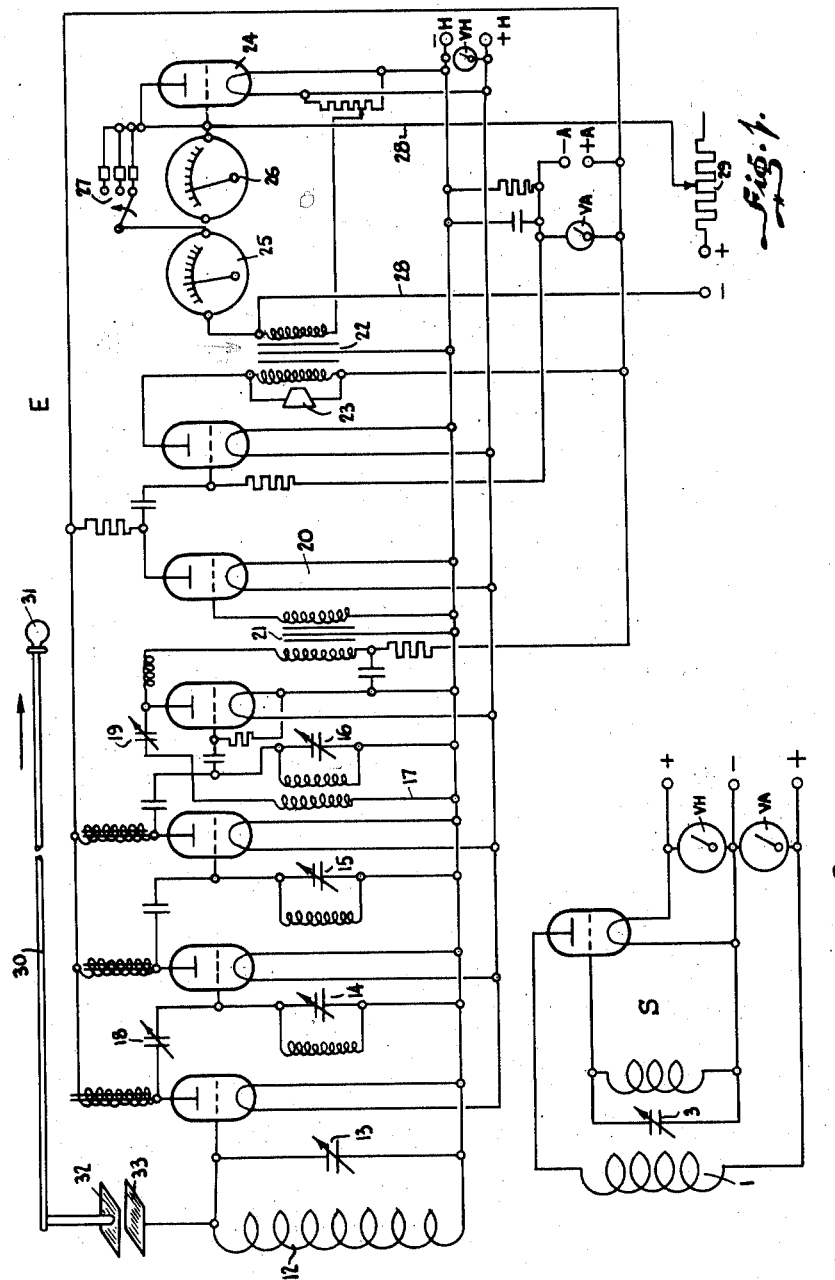
INVENTOR.
LUDWIG MACHTS.
BY
ATTORNEY.

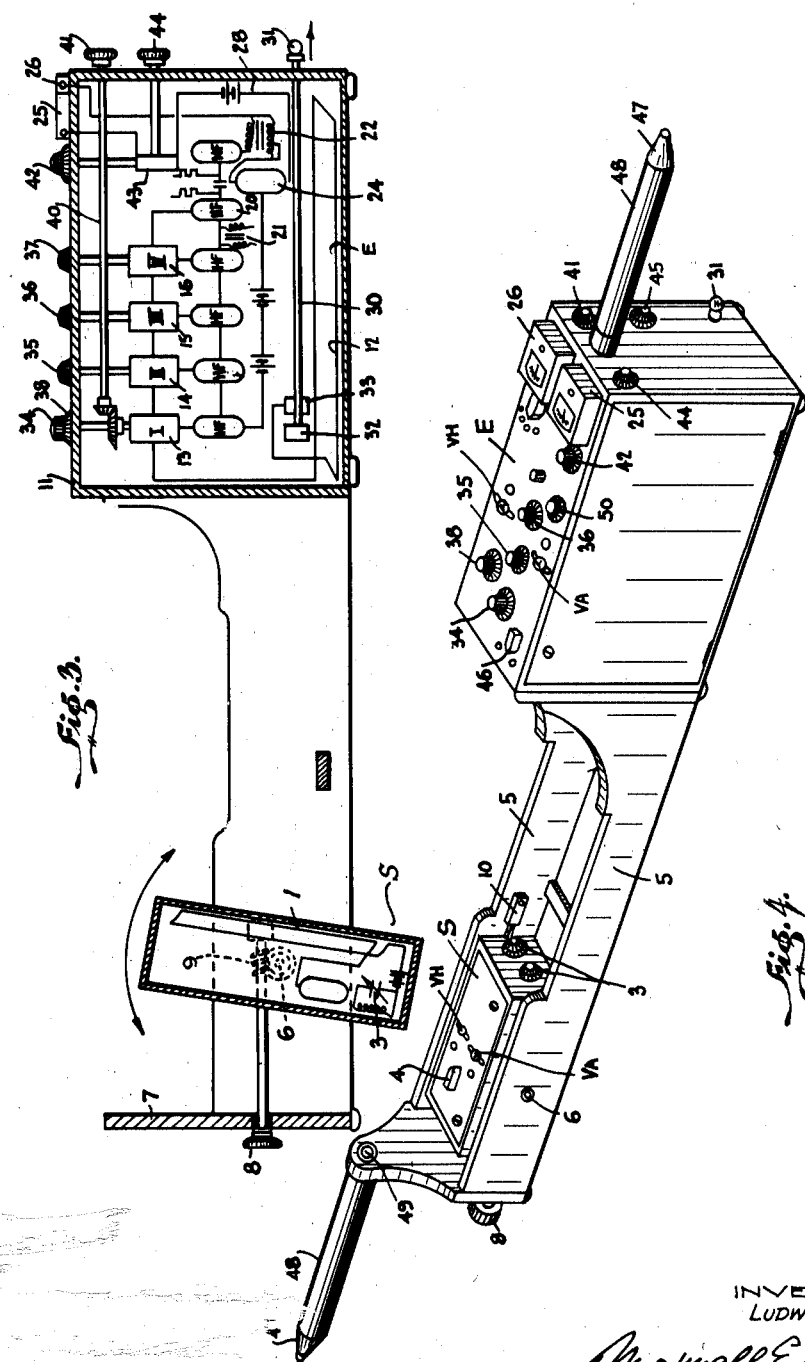

May 20, 1941.   L. MACHTS   2,242,312
GEOPHYSICAL APPARATUS
Filed May 28, 1938   3 Sheets-Sheet 3

INVENTOR.
LUDWIG MACHTS.
BY
ATTORNEY.

Patented May 20, 1941

2,242,312

UNITED STATES PATENT OFFICE 2,242,312

GEOPHYSICAL APPARATUS

Ludwig Machts, Marburg, Germany

Application May 28, 1938, Serial No. 210,695
In Germany May 31, 1937

19 Claims. (Cl. 175—182)

This invention relates to apparatus for investigating the subsoil or substructure and for the location and examination of subterranean deposits.

It is already known to produce a high frequency alternating field in the ground for the purpose of investigating the inhomogeneities of the earth or for detecting the more highly conductive deposits and their location. Data is gained concerning the properties of the subsoil which influence the electrical alternating field, by observing the effect of known fields and especially by methods of comparison.

Although the theoretical requirements for successful working in this art are not unknown, considerable difficulty is encountered in practice, and so far no completely satisfactory apparatus or process has been disclosed. The conditions of the ground as well as the working conditions are so varied and the sources of error so great, that large number of measurements must be taken to produce useful results.

The present invention aims at creating a device which although it will not answer all the questions relating to the structure and the properties of the subsoil, will yet give indications of the presence, the course and at least the horizontal dimensions of inhomogeneities or deposits in the subsoil with greatly increased accuracy and in a much shorter working period, independently of all other auxiliary means or devices.

In order to solve this problem the device must be easily transportable, so that observations can be made in uninterrupted sequence while moving over the ground, and in order to save time and to prevent gaps from occurring in the observations. Further, the apparatus must be self-contained, i. e. it must comprise both a transmitter and a receiver, in order to obtain independence of local broadcasting stations and of the influences of the space between a more or less distant transmitter and the receiver, and further to provide also an unalterable distance between transmitter and receiver, as only by this means will it be possible to bring perfectly constant conditions of observation within the bounds of possibility.

These requirements are already known per se for similar purposes. Furthermore, it is known to arrange the plane of the transmitting frame at right angles to that of the receiver frame in order to ensure by this arrangement that the plane of the latter is not intersected by the lines of force of the primary field of the transmitter, but rather only by those of a secondary field generated in the subsoil or by reflected lines of force.

The device according to the invention consists in the first place in grouping together a transmitter and a receiver in one unit which can be carried over the ground, a condition of this grouping being that the horizontal distance between the transmitter and the receiver shall remain constant during the measuring and be comparatively short, yet not so short as to jeopardise the sensitivity and immunity to interference and that further the whole transmitter or the whole receiver (i. e. the frame and at least all such parts as are capable of radiation or reception respectively) shall be rotatable in relation to the other parts in such a way as to ensure under all circumstances mutual adjustability to minimum reception.

Owing to the necessarily stringent demands for sensitivity the rotatability of the frames is not in itself sufficient.

Moreover, it has been found during experiments, that the mutual distance between transmitter and receiver is not immaterial. A maximum sensitivity value is at present only at a certain distance, although it cannot be stated beforehand under what conditions and approximately at what wavelength a certain distance leads to this maximum value. For this reason it may be advantageous to make this distance variable.

Moreover, it is not inessential how the strength of the transmitter and the amplification of the receiver are chosen. One of the main problems in this art is, of course, that of making the device so highly sensitive as to respond to very slight interference with the transmitting field by the subsoil, without at the same time being too sensitive to direct influences from the transmitter or other interferences. It has been found that the right way is that of using a transmitter of low power and a receiver having very great amplifying power. For if the adjustment to minimum reception of the receiver frame is approximately at right angles to the plane of the transmitting frame, this means that the receiver possesses the greatest receiving intensity precisely in the direction coming from the transmitter and that the receiver does not receive at all or very little because the transmitter shows the minimum transmitting intensity in the direction towards the receiver. However, these facts apply exclusively to the radiation from frame to frame. In addition there are, however, currents of energy which are difficult to control and which can hardly be entirely eliminated, emanating in the form of waves from parts of the transmitter, other than its frame, which are capable of producing radiations absorbed by the receiving aerial owing to its sensitivity to reception due to its position, or by other parts of the receiver which are capable of receiving, and thus of causing disturbing oscillations in the receiver. The weaker the transmitter, the slighter the disturbing currents which cannot be eliminated by adjustment of the frames.

It has further been found that as a rule it is best to choose from the many positions in which the frames are at right angles to one another, that position in which the transmitting frame is about perpendicular to the ground and the receiving frame approximately horizontal. This not only answers the requirements emphasised above but also corresponds to the experiments made hitherto, for in this position of the frames there is only the slightest deflection of the galvanometer needle whenever the apparatus is tilted in either direction while being carried over the ground. This does not, of course, preclude the provision of crossed frames having auxiliary windings, which latter can be connected into the circuit at will, to suit special cases or for the purpose of comparative tests.

According to experiments made, it appears advisable to use in the receiver four high frequency stages each of which can be separately tuned to maximum sharpness, the last stage being inductively coupled to the low frequency stage. Despite the attractiveness of the simplicity in handling provided by a common tuning for all high frequency circuits this will have to be left out of consideration owing to the high sensitivity of the apparatus until such time as ideally matched condensers are available. The same remarks apply to the equally attractive idea of effecting the tuning of the transmitter and of the receiver to different frequencies by means of a common drive, inasmuch as for the time being condensers having matched tuning curves for both transmitter and receiver are hardly procurable.

An inductive coupling is in the present instance preferred to others such as a resistance coupling, because the former is reliably stable, whereas this is not the case with the latter; moreover the former keeps down the overall weight of the apparatus.

The use of a transmitter without modulation is to be preferred. It must be pointed out, however, that it would also be possible to work with modulation or superposed oscillation. On the other hand previous experience has shown that it is essential to the working of the apparatus that both parts are brought to oscillate by means of feed-back coupling. The setting of this feed-back coupling must remain unaltered during measuring operations.

The sensitivity of the receiver must be variable, and this can be effected in various ways. The amplification in the low-frequency part could be varied or the degree of coupling between two high frequency circuits could be altered. The most suitable way appears to be a detuning of the first high frequency stage by altering the damping.

Seeing that the apparatus according to the invention serves fundamentally for measuring intensities and is highly sensitive a means for constantly checking the available sensitivity and the constancy of the readings is of paramount importance.

For this purpose a comparatively small mass of metal (a sheet or the like) is in carrying out the invention rotatably or slideably placed in the receiver or in the space between transmitter and receiver. Now, if for the purpose of checking the sensitivity the position or the distance of this mass in relation to the remaining parts of the apparatus is changed by an identical amount, this displacement will each time produce the same interference with the reception. The deflection of the indicating pointer must thus be the same every time, provided of course that the same degree of sensitivity is present, for instance that there has been no change in the adjustment for sensitivity or in the battery voltage. Obviously the most suitable moment for checking the sensitivity is not when the apparatus is within the range of a very considerable source of interference from the subsoil or from the surroundings, for this might lead to the appearance of supplementary influences which would alter the readings.

It is, however, very remarkable that the arrangement mentioned in connection with the checking of the sensitivity at the same time provides a very accurate check for the adjustment of the transmitter and of the receiver to minimum reception.

If this adjustment has been correctly made, the checking for sensitivity will always produce a positive deflection of the instrument. However, if the adjustment were to deviate to any appreciable extent from the correct value, the deflection of the instrument would be negative, irrespective on which side the adjustment deviated from the correct value.

Now, if this minimum adjustment is in order, a constant magnitude of the deflector both from the zero position of the instrument pointer as well as from any other scale value must be had during the sensitivity check. The checking for minimum adjustment and for sensitivity thus mutually supplement one another.

The fact that the sensitivity may be checked and the possibility it offers in combination with the adjustability, for calibrating the apparatus, results not only in obtaining the indication and reading of relatively comparable measured values in the course of a short research, but also in always obtaining during the whole of the time the apparatus is used at various moments and at any desired place, values based on an identical or comparable scale. This is, of course, of great importance for the practical use of all the results obtained by the observations.

In this connection it is a further step towards perfection that the galvanometer circuit is provided with a countercurrent circuit which, without in any way influencing the remaining apparatus, serves to bring the pointer to zero or to any other desired favourable scale value. This greatly facilitates the reading and utilisation of the indications. A sufficiency of compensatory circuits are known for this purpose, but there is hardly a means which is so well suited to the present purpose as precisely this countercurrent circuit.

It is preferable to connect two galvanometers in series, each having a different range, in the ratio of about 1:4, so that coarse readings can be obtained from the one and fine readings from the other.

For the purpose of controlling and adjusting the apparatus it is of advantage to provide the receiver with a telephone (loud-speaker). Owing to the influence of the connecting leads to a head telephone the latter is not suitable for this purpose.

Finally a few measures may be referred to, which although apparently of a more structural nature, are in reality also of the greatest importance to the practical use of the apparatus.

In the same way as the small mass of metal of the sensitivity tester already influences the indications when moved within the space between the transmitter and the receiver, the manipulation of the adjusting knobs of the receiver and of the rotating device for adjusting to minimum reception would capacitatively upset the indications. The entire space between the vertical parallel planes of the transmitter and the receiver must remain free from variable capacities. For this reason the apparatus is provided with carrying handles attached outside this area, so that neither of the carriers need enter within the said area. Further, the lever for bringing the pointer to zero and those of the sensitivity tester and of the sensitivity adjuster, as well as that of the rotating device for minimum reception, are all provided with insulating, non-conducting remote controls, which can be manipulated from outside the above-mentioned area the lever for the minimum reception adjustment, i. e. of the rotating device being preferably extended to the receiving side of the apparatus, so that all controls which serve the purpose of adjusting the apparatus can be manipulated from that side.

As the position of the apparatus in relation to space must as far as possible be kept unaltered during the carrying and reading, it has been found highly advisable to attach the handles above the centre of gravity and to mount them rotatably in ball bearings, as this will cause the apparatus to be suspended perpendicularly without being swung from side to side through any involuntary turning of the carrier's hands, which might lead to unrest in the galvanometer pointer.

Before further practical details and the directions for using the apparatus are entered into, the following description is given with reference to the drawings of an example of the embodiment of the invention.

Figure 1 is the circuit diagram of the principal parts of the receiver.

Figure 2 is the corresponding circuit diagram of the transmitter.

Figure 3 shows a lateral view of the whole equipment partly in section, with diagrammatic indication of the parts of the arrangement, the carrying handles having been omitted.

Figure 4 is a pictorial representation of the entire equipment, but not in condition for use.

Figure 5:
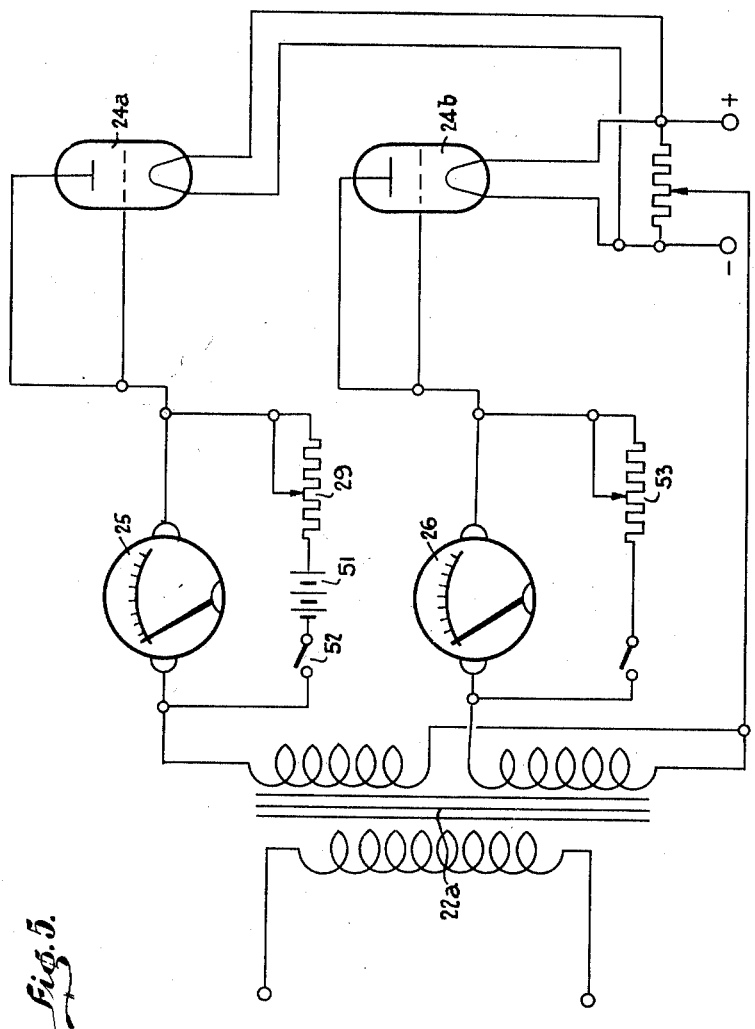
Figure 5 shows a modified circuit diagram of part of the apparatus shown diagrammatically in Figure 1.

Referring first to Figures 3 and 4, the transmitter S contains a simple single circuit valve transmitter having a frame aerial 1 located along the bottom of the casing and provided with external control knobs 2 and 3 for tuning and amplification. An "on-off" switch 4 is arranged in the supply leads to the transmitter and voltmeters $V_A$ and $V_H$ are provided for observing the filament and anode battery voltages. The casing of the transmitter S is rotatably mounted in the frame 5 of the apparatus with the aid of a pivot 6. Rotation of the casing is effected by means of a knob 8 located on the front face 7 of the common framing of the equipment, a worm and worm-wheel drive 9 being employed and during the transport the rotatable casing may be locked by a catch 10 so as to relieve any strain on the worm of the drive 9.

At the opposite end of the frame 5 of the apparatus, the receiver E is arranged in a cabinet 11 which may be closed. A frame aerial 12 lies flat on the bottom of this cabinet. The aerial 12 as well as that of the transmitter and all other associated parts of the apparatus are screened in the best possible way.

The circuit diagram of Figure 1 shows four high frequency circuits connected to the frame aerial 12, each having a variable tuning condenser 13, 14, 15 and 16. The sensitivity is controlled by the variable condenser 18 in the first circuit. A parallel circuit 17 having a variable condenser 19 is associated with the fourth stage. The parallel circuit 17 is for the purpose of increasing the sensitivity of the apparatus by effectively reducing the damping in the fourth stage, whereby an undamped oscillation in that stage may be produced. By adjusting the variable condenser 19, an interference oscillation of controllable characteristic may thus be introduced which allows of easy amplification and measurement. The inductive coupling to the low frequency stage 20 is effected by transformer 21. At the end of the second low frequency stage there is the output transformer 22, with which a telephone, loudspeaker or the like 23 is connected in parallel.

A rectifying stage connects with the secondary of the transformer 22 including a rectifier valve 24 and two galvanometers 25 and 26, connected in series. The galvanometer 25 has for example a range amounting to a quarter of that of the galvanometer 26 so as to give a deflection four times as great as that of the "coarser" instrument for the same alteration in current. The galvanometer 26 is provided with variable shunts 27 whereby its range can be further altered in several steps.

Connected in parallel with the circuit of the rectifier 24, but having opposite polarity, there is a direct current circuit 28 having a variable resistance 29, with the aid of which the position of the pointers of the instruments 25 and 26 can be influenced at will. The deflections of the instruments may be made zero, that is to say, the current flowing through them at minimum reception adjustment may be neutralised or the pointers can be adjusted to a false zero position found to be favourable for reading of the instruments. The setting of the zero will depend on circumstances, thus if an inhomogeneity in the subsoil gives a positive deflection the pointers will be set at true zero position, but if the deflections are negative, the pointers will be set to graduations displaced from true zero.

A sensitivity test may be made with the aid of a longitudinally displaceable metal plate 32 having a control rod 30 and knob 31. The plate 32 is located opposite a similar metal plate 33 connected to the aerial 12. The two limiting positions of the parts 30, 31 and 32 are determined by fixed stops, so that the displacement of the plate 32 from its initial position must always produce the same interference with the prevailing field. If all the other factors which act upon the galvanometers have remained the same, this interference will also be made visible by the same deflection of the pointers.

The knobs of the tuning condensers 13, 14, 15 and 16, are located on the top of the apparatus and are indicated by the numerals 34, 35, 36 and 37. The knob 38 of the sensitivity control 18 is mounted concentrically with, but independently rotatable with respect to the knob 34 as shown in Figure 3. In Figure 4 these two knobs are shown as being separately mounted side by side. The drive for knob 38 (Figure 3) is taken out to a knob 41 on the side wall of the cabinet by means of a pair of bevel wheels 39 and a rod 40, and thus can also be manipulated from that side. In the same way the knob 42 of the countercurrent control 43 is provided with an external remote drive 44, and the back coupling condenser 19 is provided with a remote drive 45. Thus all adjustments which are necessary when using the apparatus or after it has been connected up for use can be effected externally by means of remote controls.

A main switch 46 serves to control the current supply to the receiver E.

In the two end walls of the complete apparatus threaded bushes 49 (one shown in Figure 4) are provided such bushes being located above the level of the centre of gravity of the equipment. When the apparatus is in use, two carrying arms are firmly screwed into these bushes. The carrying arms consist each of a shaft 47 which is firmly screwed into the bush, and on to which is pushed a freely rotatable gripping tube 48 mounted on ball-bearings. In order to bring the aerial of the receiver to a horizontal position the axes of the shafts 47 must be kept horizontal, and this position can be checked by means of a level 50.

The voltages of the batteries of the receiver E are arranged to be indicated upon voltmeters $V_A$ and $V_H$.

Figure 5 shows a variation of the galvanometer circuit shown in Figure 1. The two galvanometers 25 and 26 are again fed in the same manner from the output transformer 22a and although the secondary winding of the latter is split both halves are connected in parallel, yet the two galvanometers can be independently influenced. For this purpose each of the galvanometers 25 and 26 has an associated rectifying valve 24a and 24b such valves being supplied with filament current from a common source.

A countercurrent circuit, consisting of the direct current circuit 28a, with variable resistance 29, direct current supply 51, and on-off switch 52, is in this case connected only to the terminals of the highly sensitive galvanometer 25. The "residual deflection" is thus suppressed only at this galvanometer, that is the pointer of this galvanometer only may be set to any desired suitable position. The other and less sensitive galvanometer 26 is not affected by such setting. However, the latter is provided with a shunt resistance 53 which can be disconnected from the circuit, and is variable so as to allow of a smooth progressive alteration in sensitivity.

It is highly advisable to make the equipment in such a way that it may be dismantled into several groups for easier transport over a distance, for example by lorry. For this purpose the frame part 5 together with the transmitter S is made separable as one unit, and the receiver E in the cabinet 11 forms a second unit. Both can be assembled rigidly by means of set screws and wing nuts, but they can of course also be mounted slidably or rotatably in relation to one another. The carrying grip handles 47—49 are, as indicated above, detachable.

The following are the most essential directions regarding the method of using the equipment.

The transmitter and the receiver are first carefully tuned to a predetermined wavelength in known manner with the aid of the means described above. Such wavelength should, as far as possible, be different from any receivable local broadcasting wavelengths. The means for suppressing damping must be kept tightly coupled during the tuning. The fact that the transmitter is correctly tuned to the previously tuned receiver is made audible in the telephone by the so-called coupling whistle.

The choice of a working frequency can in many cases be made directly in accordance with the geological conditions of the locality to be investigated, inasmuch as first one and then another wavelength may be found to be suitable for indicating the differences which are present according to the rock formations which are adjacent to one another at a particular spot. The selection can be effected by a corresponding adjustment of the transmitting and receiving oscillation circuits of the apparatus, if separate researches for this purpose have not already been effected.

Sometimes it is advantageous to adjust the distance between the transmitter and receiver in order to find an optimum value by this means.

Now, after the catch 10 has been released the apparatus is accurately adjusted to minimum reception by rotating the transmitter S by means of the control knob 8, through the worm drive 9. The correct position can be checked optically or acoustically, and in this connection the sensitivity tester 31—33 described above is of particular value. The sensitivity testing is furthermore repeated at frequent intervals. As constancy and mutual comparability of all the separate indications are essential to the working, it is recommended to switch on the current for some time prior to commencing work and before adjusting the batteries, so as to bring them to a condition of uniformity.

The sensitivity of the receiver is adjusted by means of the parts 18 (38) 41, and remains unaltered during the measuring. The same remarks apply to the means for suppressing damping.

As far as possible the sensitivity with which it is intended to work should always be chosen as high as possible, that is to say, an adjustment should be chosen at which, when the sensitivity tester 31—33 is used, the deflection is greatest.

Due to the fact that both galvanometers 25, 26 or (according to Figure 5) at least the highly sensitive indicating instrument 25, can at all times be adjusted or set to the most favourable graduation mark for the work in hand, by means of the countercurrent circuit 28 (or 28a) independently of the "minimum current" (residual deflection) prevailing at the moment, it is possible to increase greatly the sensitivity, without running the risk of losing accuracy near the limits of range of the measuring or indicating instruments.

With the circuit of the indicating galvanometers arranged according to Figure 1 a few test measurements are first carried out in the locality to be investigated, when it will soon become apparent whether the basic position of the pointer is usable or whether, owing to the tendency to negative deflections this basic position must be set to a higher graduation mark by means of the countercurrent. If necessary the sensitivity of the less sensitive instrument 26 may be further decreased by means of the tapped shunt 27.

If, after a series of measurements, a return is made to the starting point, then the "residual deflection," that is to say the basic position of the pointer, would be the same as at the commencement, provided that neither the sensitivity of the instrument nor the countercurrent circuit had been adjusted in the meantime. If it differs, the difference can be divided and allotted with least inaccuracy among the values read off, also taking into consideration the time that has elapsed.

Where the instruments have the circuit arrangement shown in Figure 5 a more independent adjustment is possible. The above mentioned zero point method can be carried out with the aid of the galvanometer 26 only, and also the sensitive instrument 25 can be adjusted by means of the countercurrent control 29 (or 44) at all appropriate stages and without regard to the absolute indicating value in such a way that the minuteness of the difference to be observed can be accurately followed. Where no value is placed upon a comparison with an initial value, it is of course permissible to alter the measuring range of the instrument 26 according to requirements by means of the variable resistance 53 in the course of the measuring operation.

Basically it is desirable to start from a geologically known locality and to observe the changes of the indications as compared with the readings obtained at such starting point. So long as deflections of the same nature and order of magnitude are observed in the locality, it may safely be concluded that identical subsoil conditions are present, although of course all relevant factors that might play a role in this must be taken into consideration.

The apparatus not only allows of determining a spot where a change in the constitution of the subsoil occurs but also of determining the direction of the course of such inhomogeneity, provided that this inhomogeneity really does extend in a particular direction over a particular distance. For this purpose one of the carrying arms of the complete equipment, i. e. the one on the receiving side, is left in the position in which the receiver indicated a different deflection from the value obtained in the immediate vicinity, whereas the other carrying arm together with the transmitting end of the apparatus is pivoted around the first mentioned point. So long as the second carrying arm with the transmitter remains above the longitudinally extending mass of subsoil which caused the deflection, the latter will remain unaltered or almost unaltered. However, as soon as the transmitter during its pivoting passes beyond the edge of the said mass of subsoil, the deflection will cease. At that moment the edge of the mass, for example, a metallic vein or the like, runs parallel to the longitudinal axis of the apparatus. This direction can be determined by means of a compass. When pivoting the apparatus in the opposite direction the deflection which previously disappeared will reappear when the parallel position is reached.

It must be pointed out here that the exceedingly increased sensitivity of the apparatus, which cannot in any way be compared with that of, for example, a usual radio receiver, requires very stringent precautionary measures. This applies not only to the screening of certain components of the device, but for example also to the fact that as mentioned above, all components of the transmitter and of the receiver, which are capable of radiating or receiving respectively, must form one compact entity when the apparatus is being turned for the purpose of obtaining the so exceedingly important position of minimum reception. Such parts include even the smallest leads and chassis parts, and even the metallic parts of the batteries. It would further be impossible to listen for checking purposes to the reception which has been made audible by means of side bands or modulation, by means of ordinary headphones, because the connecting leads would in themselves exert an influence upon the field present.

What I claim and desire to secure by Letters Patent of the United States is:

1. A portable device for investigating properties of the substructure of the earth's surface through influence of an electric alternating field by said properties, comprising a radio transmitting unit including a frame aerial, a radio receiving unit having associated with it a second frame aerial, a structure for the reception of both said receiving and transmitting units, a pivotal support for at least one of said units received in said structure, means for adjusting the pivotally supported unit so as to vary the linkage between said two units, and a mass of metal displaceably mounted in relation to the receiver and arranged to lie within the field of influence of the transmitter so as to repeatedly cause a disturbance in the said field.

2. A portable device for investigating properties of the substructure of the earth's surface through influence of an electric alternating field by said properties, comprising a radio transmitting unit including a frame aerial, a radio receiving unit having associated with it a second frame aerial, a structure for the reception of both said receiving and transmitting units, a pivotal support for at least one of the units at said structure, means for adjusting the pivotally supported unit so as to vary the linkage between said two units, an output transformer in said receiving unit, a split secondary winding in said output transformer, a high sensitive galvanometer located in circuit with one portion of said split secondary winding, a low sensitive galvanometer located in the circuit of the other portion of said split secondary winding, rectifying units included in each of the galvanometer circuits, and a countercurrent arrangement associated with the highly sensitive galvanometer for producing zero settings thereof.

3. A portable device for investigating properties of the substructure of the earth's surface through influence of an electric alternating field by said properties, comprising a radio transmitting unit, a radio receiving unit, a structure for receiving said units thereon, a connection between said structure and at least one of said units to permit relative adjustment of said units, means for controlling such relative displacement between the units, an insulated remote connection to said means for controlling the relative displacement of the units and carrying means for said structure located externally thereof and extending in a direction away from said structure.

4. A portable device of the character described comprising a radio transmitting unit, a radio receiving unit, a structure for supporting both of said units, means for indicating the field received by said receiving unit, and carrying means associated with said structure and extending from the extremities of said structure longitudinally thereof.

5. A portable device of the character described comprising a radio transmitting unit, a radio receiving unit, a structure for supporting both of said units at opposed ends thereof, means for indicating the field received by said receiving unit, and carrying means associated with said structure and longitudinally extending from said opposed ends of said structure.

6. A portable device of the character described comprising a radio transmitting unit, a radio receiving unit, a structure for supporting both of said units at opposed ends thereof, at least one pivotal support between said structure and said units, means for indicating the field received by said receiving unit, and carrying means associated with said structure and longitudinally extending outwardly from said opposed ends of said structure.

7. A portable device of the character described comprising a radio transmitting unit, a radio receiving unit, a structure for supporting both of said units at opposed ends thereof, means for pivotally supporting and adjusting said transmitting unit on said structure, at least one pivotal support between said structure and said units, means for indicating the field received by said receiving unit, and carrying means associated with said structure and extending lengthwisely of and outwardly from said opposed ends of said structure.

8. A portable device of the character described comprising a radio transmitting unit, a radio receiving unit, a structure for supporting both of said units at opposed ends thereof, means operable from without and extending with said structure for varying the angular relationship between said transmitting and said receiving unit within the limits of the ends of said structure, and means for indicating the field received by said receiving unit.

9. A portable device of the character described comprising a radio transmitting unit, a radio receiving unit, a structure for supporting both of said units at opposed ends thereof, at least one pivotal support between said structure and said units, means for varying the angular relationship between said transmitting and said receiving unit within the limits of the ends of said structure, means for indicating the field received by said receiving unit, and carrying means associated with said structure and extending outwardly from said opposed ends of said structure.

10. A portable device of the character described comprising a radio transmitting unit, a radio receiving unit, said units being provided with control means, a structure for supporting both of said units at opposed ends thereof, at least one pivotal support between said structure and said units, means for varying the angular relationship between said transmitting and said receiving unit within the limits of said ends of said structure, means for indicating the field received by said receiving unit, carrying means associated wiith said structure and extending outwardly from said opposed ends of said structure, and insulating means for operating said control means from without the ends of said structure.

11. A portable device of the character described comprising a radio transmitting unit provided with a first frame aerial, a radio receiving unit provided with a second frame aerial, a third frame aerial associated with at least one of said first and second frame aerials and disposed at right angles thereto, said third frame being connectable arbitrarily, said units being provided with control means, a structure for supporting both of said units at opposed ends thereof, at least one pivotal support between said structure and said units, means for varying the angular relationship between said transmitting and said receiving unit, means for indicating the field received by said receiving unit, carrying means associated with said structure, said carrying means extending outwardly from said opposed ends of said structure, and insulating means for operating said control means from said ends of said structure.

12. A portable device of the character described comprising a radio transmitting unit, a radio receiving unit including a plurality of tunable high frequency circuits, coupling means for simultaneously tuning all of said high frequency circuits, said units being provided with control means, a structure for supporting both of said units at opposed ends thereof, at least one pivotal support between said structure and said units, means for varying the angular relationship between said transmitting and said receiving unit, means for indicating the field received by said receiving unit, carrying means associated with said structure, said carrying means extending outwardly from said opposed ends of said structure, and insulating means for operating said control means from said ends of said structure.

13. A portable device of the character described comprising a radio transmitting unit, a radio receiving unit including at least four stages of separately tunable high frequency circuits, said receiving unit further including a low frequency stage, and an inductive coupling between said low frequency stage and the last of said high frequency stages, said units being provided with control means, a structure for supporting both of said units at opposed ends thereof, at least one pivotal support between said structure and said units, means for varying the angular relationship between said transmitting and said receiving unit, means for indicating the field received by said receiving unit, carrying means associated with said structure, said carrying means extending outwardly from said opposed ends of said structure, and insulating means for operating said control means from said ends of said structure.

14. A portable device of the character described comprising a radio transmitting unit, a radio receiving unit, means for producing superimposed oscillation or modulations in at least one of said units, said units being provided with control means, a structure for supporting both of said units at opposed ends thereof, at least one pivotal support between said structure and said units, means for varying the angular relationship between said transmitting and said receiving unit, means for indicating the field received by said receiving unit, carrying means associated with said structure, said carrying means extending outwardly from said opposed ends of said structure, and insulating means for operating said control means from said ends of said structure.

15. A portable device of the character described comprising a radio transmitting unit, a radio receiving unit, feed back arrangements adapted for varying the degree of oscillations in at least one of said units, said units being provided with control means, a structure for supporting both of said units at opposed ends thereof, at least one pivotal support between said structure and said units, means for varying the angular relationship between said transmitting and said receiving unit, means for indicating the field received by said receiving unit, carrying means associated with said structure, said carrying means extending outwardly from said opposed ends of said structure, and insulating means for operating said control means from said ends of said structure.

16. A portable device of the character described comprising a radio transmitting unit, a radio receiving unit, a structure for supporting both of said units at opposed ends thereof, means for indicating the field received by said receiving unit, and handles extending outwardly from said opposed ends of said structure, said handles being connected to said structure above the center of gravity thereof.

17. A portable device of the character described comprising a radio transmitting unit, a radio receiving unit, a structure for supporting both of said units at opposed ends thereof, means for indicating the field received by said receiving unit, and handles extending outwardly from said opposed ends of said structure, said handles being journaled on ball bearings and being connected to said structure above the center of gravity thereof.

18. A portable device of the character described comprising a radio transmitting unit, a radio receiving unit, a structure for supporting both of said units at opposed ends thereof, means for indicating the field received by said receiving unit, and handles extending outwardly from said opposed ends of said structure, said structure being swingably connected to said handles above the center of gravity thereof.

19. A portable device for investigating properties of the substructure of the earth's surface through influence of an electric alternating field by said properties, comprising a radio transmitting unit having a first frame aerial, a radio receiving unit having a second associated frame aerial, a structure for carrying both of said units, a pivotal support for said transmitting unit, means for adjusting the latter with respect to its pivotal support, said radio transmitter being such as to emit comparatively weak signals, at least four stages of separately tunable high frequency circuits in said receiving unit, and inductive coupling from the last of said high frequency stages, a low frequency output stage associated with said inductive coupling, means for producing superimposed oscillations or modulations in the high frequency stages of said receiving unit, feed-back arrangements in at least one of said units formed by said transmitter and said receiver so as to vary the degree of oscillation, and a controllable condenser in the first high frequency stage of said receiving unit for detuning said stage by the alteration of the damping thereof to produce sensitivity control of the receiver.

LUDWIG MACHTS.